Sept. 28, 1926.

S. WEIN 1,601,607

LIGHT SENSITIVE ELECTRICAL RESISTANCE DEVICE

Filed Oct. 18, 1924

INVENTOR
SAMUEL WEIN
BY
H. R. Van Deventer
ATTORNEY

Patented Sept. 28, 1926.

1,601,607

UNITED STATES PATENT OFFICE.

SAMUEL WEIN, OF NEW YORK, N. Y., ASSIGNOR, BY DIRECT AND MESNE ASSIGN-
MENTS, TO RADIO PATENTS CORPORATION, OF NEW YORK, N. Y., A CORPORATION
OF NEW YORK.

LIGHT-SENSITIVE ELECTRICAL RESISTANCE DEVICE.

Application filed October 18, 1924. Serial No. 744,527.

My invention relates to improvements in light-sensitive electrical resistance devices, also known as photo electric cells, which include a conductive element of such a nature that the electrical resistance thereof varies according to the amount and intensity of the light to which it is exposed.

The invention comprises both a light-sensitive electrical resistance device, and a method of making same, of such a nature that the lag or inertia usually experienced in the practical use of such devices is entirely eliminated; that is to say, the change in the value of the electrical resistance takes places at virtually the same instant as the variation in the amount or intensity of the light falling upon the conductive element which furnishes the resistance.

The objects and advantages of the invention will in part be obvious and in part fully disclosed in the following specification which sets forth the best manner and form of my invention now known to me; but the disclosure is of course illustrative only, and I may resort to alterations in details of structure and proceeding, not necessarily mentioned herein, but constituting no departure from the nature and scope of the invention as defined in the broad and general meanings of the terms of the appended claims.

Figure 1:
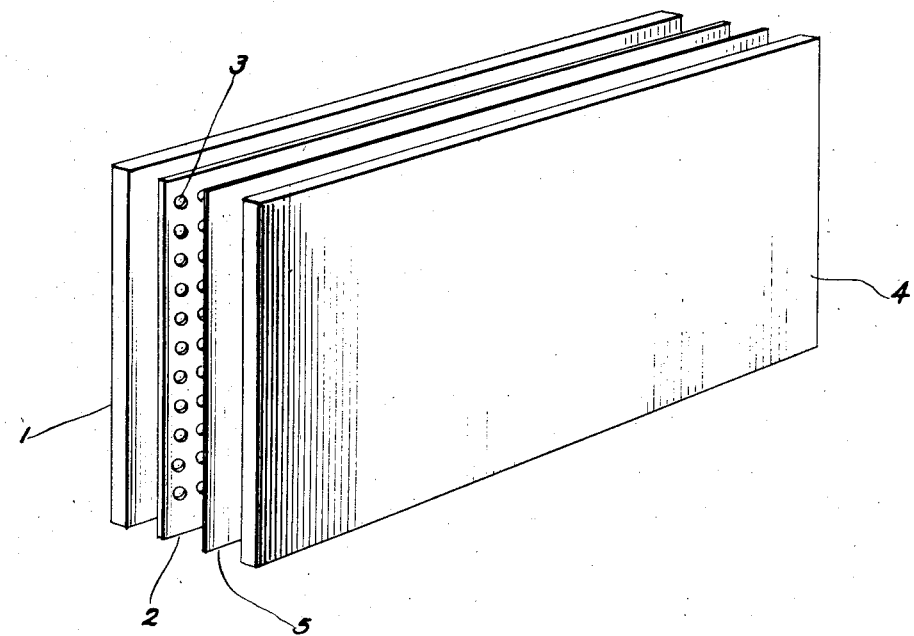
Figure 2:
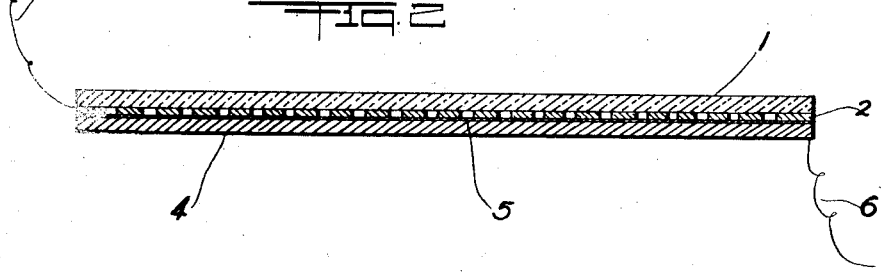

On the drawings,

Figure 1 shows the parts of a photo electric cell, or light-sensitive resistance device, and the way in which these parts are assembled; and Figure 2 is a longitudinal sectional view showing one method in which the parts may be assembled.

The same numerals identify the same parts throughout.

My invention pertains especially to the production of very thin films of substances which are electrically conductive, but vary in the amount of electrical resistance which they oppose to the passage of the current through them when they are subjected to the action of light. As an example of such substances, I may mention selenium, metallic sulphides, and other compounds which exhibit in ohmic resistance on exposure to variations in the intensity of light of either a chromatic or mono-chromatic character. Selenium is, of course, very well known in connection with this subject and some of the metallic sulphides are more sensitive to light than others, depending on the physical condition of the single particles aggregated to provide a light sensitive surface.

Heretofore in the production of light sensitive surfaces, either the selenium or a metallic sulphide was disposed between two electrically conductive materials and annealed. This process gave very good light sensitiveness with selenium; but in the case of metallic sulphides, the conductors through which the electric current was passed often had to be attached to the sulphide body by means of a clamp or by soldering.

In the manufacture and use of light sensitive electrical resistance devices employing selenium, various means have been tried for the purpose of disposing the selenium between a pair of electrodes or terminals, so as to connect the selenium in circuit and enable a current to flow through it and the resistance of the selenium to be altered. Sometimes the selenium was converted into molten or plastic form and spread out over a supporting surface by any convenient means.

At other times, the selenium was transformed into a vapor and caused to condense on the supporting surface, and cathode disintegration too has been attempted.

All such expedients, however, while affording constructions that enabled the selenium and metallic sulphides to respond very quickly to varying degrees of chromatic and mono-chromatic light in the resistance which they opposed to the passage of an electric current, also involved a time period, occasionally referred to as a "creeping" of the current on exposure to light, and a "creeping" of the current on shutting off the light; that is to say, when a change took place in the intensity of the light falling upon the device, there was always some inertia or lag in the operation of the device, and the corresponding change in the resistance consequently took place a definite interval afterwards. This lag in function is due to the annealing of the selenium and sometimes to the thickness of the film of the selenium, or the metallic sulphide selected. To some extent this lag can be reduced to a minimum by making the film as thin as possible, because the thinner the film of light-sensitive material, the less inertia it will evince.

In prior light-sensitive devices, the film could never be made thin enough, and even when an extremely thin film could be obtained, it was not homogeneous or uniform in thinness and the process was entirely too difficult and expensive to permit its adoption as universal or standard practice.

The method which forms this invention is novel and inexpensive and it enables me to produce films of light-sensitive substances with which the lag or inertia is entirely obviated. The desired result I secure by dissolving amorphous selenium or metallic sulphide or any other suitable substance in disulphide of carbon, covering the supporting surface with the liquid solution and then causing the solvent to volatilize or dry up, leaving a very thin, fine and homogeneous film of the light-sensitive substance remaining on the surface.

When selenium is employed and a tenuous film of uniform thickness is obtained, the film may be afterwards annealed to the required extent, to make its light-sensitive quality most efficient and pronounced. But the metallic sulphides require no annealing. After they are deposited from the solution on the supporting surface, they will give the necessary accurate results without further treatment.

I do not wish to limit or restrict myself to the use of carbon disulphide as the solvent for the selenium or the other light-sensitive substance as I can employ other solvents such as aniline, or anything else which will conveniently take up any of the metallic sulphides and produce complete solution. One of the important advantages of my process of making light-sensitive electrical resistance devices is apparent from the fact that small amounts of other materials can be added with the light-sensitive substances in the solution to modify the physical characteristics of the film after the solution has been evaporated and the film deposited.

The manufacture of the metallic sulphide is carried on by dissolving any suitable or convenient metallic salt in water and permitting hydrogen sulphide vapors to bubble through this solution, in this way the metallic sulphide is precipitated out of solution as a sulphide of the particular metallic salt first used.

In any event, I secure, in the practice of this invention, a film of extreme thinness which is capable of responding instantaneously to a variation in the degree of light falling upon it, so that any lag or inertia in the operation of the device is entirely removed. Furthermore, such a film is easily produced and at the same time mounted so that it can very conveniently be handled, connected in circuit and put to the use required.

It is sometimes desirable to preliminarily treat the surface upon which the coating of light sensitive material is to be deposited so as to secure uniformity and regularity of deposit. According to the present invention I may treat the surface either with collodion lacquer or cellulose acetate lacquer or other material to prevent oxidation during the process of annealing, or the protection of the coating.

In Figure 1, which illustrates to some extent the structure of a photo electric cell and process of making same according to my invention, the numeral 1 indicates a pane of glass or some other transparent material, and 2 is a plate or sheet of some conductive material having a number of perforations 3, extending through from one face to the other. At 4, I show a metal plate and 5 indicates a film of selenium or some other light-sensitive substance between the plate 4 and plate 2, this film of course being shown with its thickness exaggerated in Figure 1 and Figure 2, for the sake of clear illustration. This film can be deposited on the surface of the plate 4 if desired and the plates 1, 2 and 4 secured together as indicated in Figure 2. If then an electric conductor 6 be connected to the plate 4 and another conductor 7 be joined to the plate 2, current flowing through the conductors 6 and 7 must pass through the film 5. If then light falls upon the transparent plate 1, this light will pass through the perforations 3 and strike upon the film of light-sensitive substance. As the intensity or amount of light is varied, the resistance of the film 5 will change correspondingly.

The film 5 can be deposited upon the plate 4 in the manner above described, and the perforations 3 in the plate 2 may be slots if desired, or have any other shape.

The film 5 can be deposited upon the one surface of the transparent plate 1 when necessary, and the plates 2 and 4 omitted; the conductors 6 and 7 then being simply joined to the opposite ends of the film. Also, the film instead of being continuous can be made to consist of strips or sections connected together in any convenient fashion. In fact, the physical structure of the device is not material to the invention, so long as the film is of the thinness and characteristics described; since the film may be formed upon the surface of any member that will support it and enable the film to be connected in an electrical circuit.

Having described my invention, what I believe to be new and desire to secure and protect by Letters Patent of the United States is:—

1. The method of making a light-sensitive electrical resistance device which consists in dissolving light-sensitive material spreading the solution upon the surface of a supporting member and then evaporating the solution to deposit the substance in the form of a film upon said surface.

2. The method of making a light-sensitive electrical resistance device which consists in dissolving a light-sensitive electrically conductive substance, treating the surface of a supporting member, spreading said solution upon said surface and then evaporating it to cause said substance to be deposited on the surface in the form of a film, the preliminary treatment of said surface being conducive to the uniformity and protection of the film.

3. The method of making a light-sensitive electrical resistance device which consists in dissolving an electrically conductive light-sensitive substance, spreading said substance in solution on a surface presented by a supporting member, and treating said solution to cause said substance to be deposited on the surface in the form of a thin homogeneous film.

4. The method of making a light-sensitive electrical resistance device which consists in dissolving a light-sensitive substance, spreading the substance in solution on a surface presented by a supporting member, causing said substance to be deposited on said surface in the form of a thin homogeneous film, and then annealing the film.

5. The method of making a light sensitive electrical resistance device which consists in preliminarily treating a supporting surface, applying thereto a solution containing a light sensitive substance, and depositing the light sensitive substance from the solution onto the supporting surface.

Signed at New York, in the county of New York and State of New York this 6th day of October, A. D. 1924.

SAMUEL WEIN.